US011636439B2

(12) United States Patent
Truong et al.

(10) Patent No.: US 11,636,439 B2
(45) Date of Patent: Apr. 25, 2023

(54) TECHNIQUES TO APPLY MACHINE LEARNING TO SCHEDULE EVENTS OF INTEREST

(71) Applicant: Capital One Services, LLC, McLean, VA (US)

(72) Inventors: Anh Truong, Champaign, IL (US); Mark Louis Watson, Urbana, IL (US); Austin Grant Walters, Savoy, IL (US); Jeremy Edward Goodsitt, Champaign, IL (US); Reza Farivar, Champaign, IL (US); Vincent Pham, Champaign, IL (US); Fardin Abdi Taghi Abad, Champaign, IL (US); Kenneth Taylor, Champaign, IL (US)

(73) Assignee: Capital One Services, LLC, McLean, VA (US)

( * ) Notice: Subject to any disclaimer, the term of this patent is extended or adjusted under 35 U.S.C. 154(b) by 183 days.

(21) Appl. No.: 16/444,819

(22) Filed: Jun. 18, 2019

(65) Prior Publication Data
US 2020/0402019 A1  Dec. 24, 2020

(51) Int. Cl.
*G06Q 10/10* (2012.01)
*G06Q 10/1093* (2023.01)
(Continued)

(52) U.S. Cl.
CPC ....... *G06Q 10/1093* (2013.01); *G06F 16/906* (2019.01); *G06F 16/908* (2019.01); *G06N 20/00* (2019.01)

(58) Field of Classification Search
CPC ............ G06F 16/90328; G06F 16/906; G06F 16/907; G06F 16/908; G06F 16/909;
(Continued)

(56) References Cited

U.S. PATENT DOCUMENTS

| 5,873,056 A * | 2/1999 | Liddy ................. G06F 16/313 704/9 |
| 2004/0003042 A1 * | 1/2004 | Horvitz ............... G06Q 10/109 709/204 |

(Continued)

OTHER PUBLICATIONS

"Application (app)." A Dictionary of Computer Science, 7th ed., Oxford University Press, 2016, Oxford Reference, <https://www.oxfordreference.com/view/10.1093/acref/9780199688975.001.0001/acref-9780199688975-e-164>, accessed Aug. 26, 2019. (Year: 2016).*

(Continued)

*Primary Examiner* — Cory W Eskridge
(74) *Attorney, Agent, or Firm* — KDW Firm PLLC

(57) ABSTRACT

Techniques to apply machine learning to schedule events of interest for a device user. As described herein, a typical device user is inundated with information suggesting activities and other things to do. Using these techniques, the information is categorized according to the activity and those activities that are most likely to be engaged in by the device user are recommended to the device user (via their device) as events of interest. If the device user selects an event of interest, the device is updated to reflect that selection. For instance, a calendar application may be updated to include an event description at the event's date and time. Other embodiments are described and claimed.

17 Claims, 8 Drawing Sheets

User Interface 300

(51) Int. Cl.
*G06N 20/00* (2019.01)
*G06F 16/906* (2019.01)
*G06F 16/908* (2019.01)

(58) Field of Classification Search
CPC ............. G06Q 10/109; G06Q 10/1093; G06Q 10/1095; G06Q 10/1097
See application file for complete search history.

(56) References Cited

U.S. PATENT DOCUMENTS

| | | | | |
|---|---|---|---|---|
| 2006/0010206 | A1* | 1/2006 | Apacible | H04M 3/436 709/205 |
| 2010/0082376 | A1* | 4/2010 | Levitt | G06Q 10/06311 705/7.18 |
| 2011/0302117 | A1* | 12/2011 | Pinckney | G06Q 30/02 706/12 |
| 2013/0307764 | A1* | 11/2013 | Denker | G06F 3/013 345/156 |
| 2013/0311411 | A1* | 11/2013 | Senanayake | G06F 3/013 706/13 |
| 2014/0337751 | A1 | 11/2014 | Lim et al. | |
| 2015/0379476 | A1* | 12/2015 | Chaudhri | G06F 3/0414 705/7.18 |
| 2017/0140285 | A1* | 5/2017 | Dotan-Cohen | G06F 9/453 |
| 2019/0205839 | A1* | 7/2019 | Dotan-Cohen | H04L 67/535 |

OTHER PUBLICATIONS

"Machine learning." A Dictionary of Computer Science, 7th ed., Oxford University Press, 2016, Oxford Reference, <https://www.oxfordreference.com/view/10.1093/acref/9780199688975.001.0001/acref-9780199688975-e-3056>, accessed Aug. 26, 2019. (Year: 2016).*

"Machine learning." A Dictionary of Statistics, 3rd ed., Oxford University Press, 2014, Oxford Reference, <https://www.oxfordreference.com/view/10.1093/acref/9780199679188.001.0001/acref-9780199679188-e-2380>, accessed Aug. 26, 2019. (Year: 2014).*

* cited by examiner

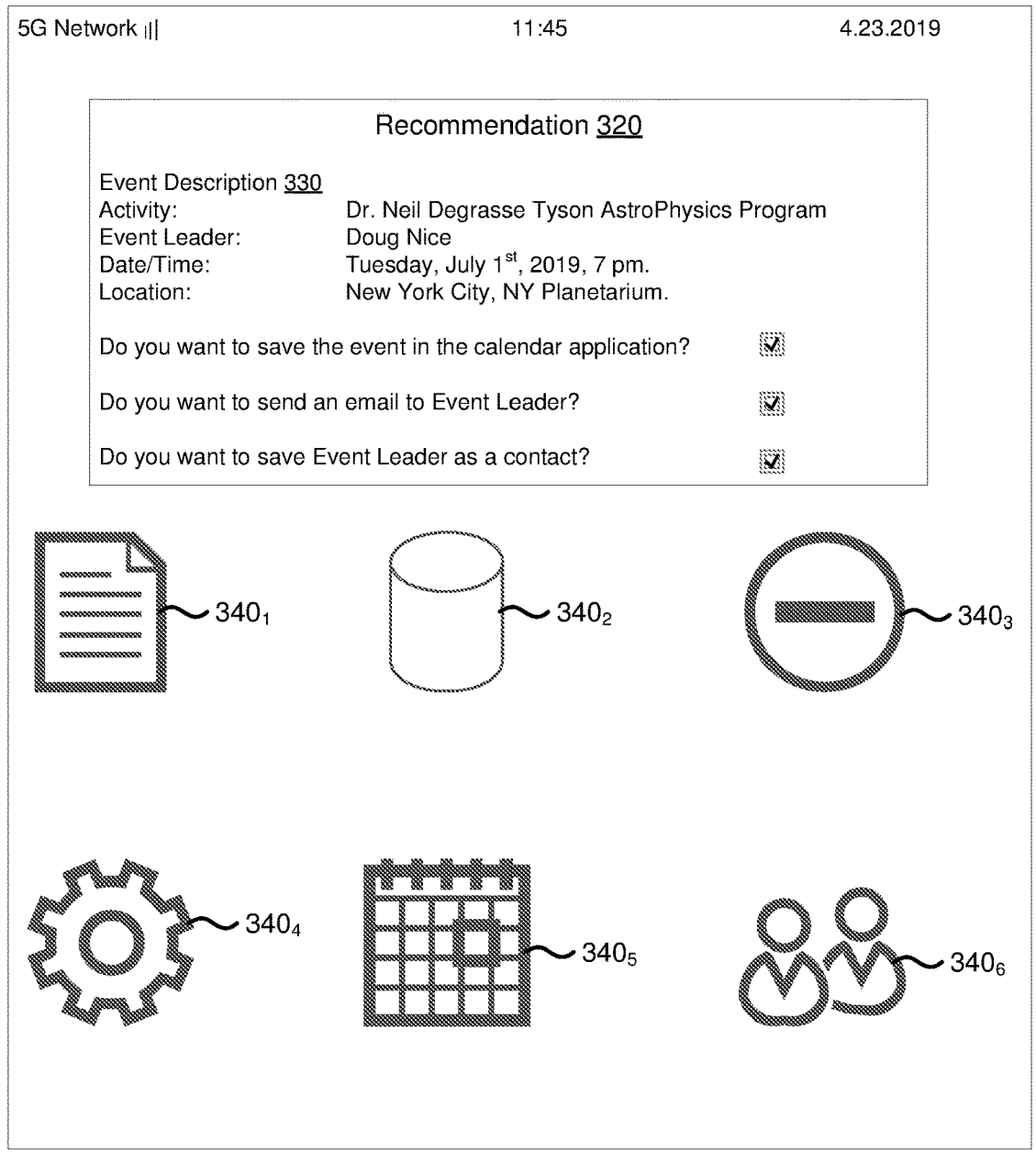
FIG. 3

500

```
PROCESS DATABASE INFORMATION COMPRISING RECORDS
CORRESPONDING TO EVENTS IN A GEOGRAPHIC AREA
502
          │
TRAIN A MACHINE LEARNING MODEL BASED IN PART ON
USER PREFERENCE DATA
504
          │
IDENTIFY RECORDS HAVING EVENTS OF INTEREST BASED
UPON A MACHINE LEARNING MODEL
506
          │
GENERATE RECOMMENDATION DATA FOR THE EVENTS OF
INTEREST AND DISPLAY, ON A GRAPHICAL USER
INTERFACE, THE RECOMMENDATION DATA AND A
SELECTABLE OPTION FOR EACH EVENT
508
          │
STORE ONE OR MORE ENTRIES IN A CALENDAR
APPLICATION
510
```

```
┌─────────────────────────────────────┐
│ GROUP HISTORICAL EVENTS INTO CLUSTERS │
│                 602                   │
└─────────────────────────────────────┘
                    │
┌─────────────────────────────────────┐
│ MAP AN EVENT DESCRIPTION TO ATTRIBUTE DATA │
│                 604                   │
└─────────────────────────────────────┘
                    │
┌─────────────────────────────────────┐
│ COMPARE ATTRIBUTE DATA OF AN EVENT TO THE │
│ CLUSTERS AND DETERMINE A LIKELIHOOD THAT THE │
│     EVENT IS AN EVENT OF INTEREST     │
│                 606                   │
└─────────────────────────────────────┘
                    │
┌─────────────────────────────────────┐
│ COMPARE THE EVENT TO USER AVAILABILITY DATA TO │
│ DETERMINE WHETHER THERE IS AN OPEN TIME SLOT IN A │
│         CALENDAR APPLICATION          │
│                 608                   │
└─────────────────────────────────────┘
```

*FIG. 6*

TECHNIQUES TO APPLY MACHINE LEARNING TO SCHEDULE EVENTS OF INTEREST

BACKGROUND

One person typically has multiple devices and each device becomes inundated with information. Often, this person has some information suggested to them on a regular basis such as through communications and notifications. The person may even request some information such as items and ideas pertaining to their hobbies and recreational activities. However, few areas of control are afforded this person regarding these communications and notifications. People enjoy their hobbies and recreational activities but often find it difficult to peruse through the countless amount of information available to them and actually find some event of interest. There is a need for technology capable of triaging the information available on a device to ensure that important pieces of information are presented to the device user and not hidden amongst the countless amount of information.

It is with respect to these and other considerations that the present improvements have been desired.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

Various embodiments are generally directed to techniques to apply machine learning to schedule events of interest. Some embodiments are particularly directed to techniques to apply machine learning to schedule events of interest for a device user. In one embodiment, for example, an apparatus may comprise logic stored in computer memory and executed on a processing circuit. The logic may be operative to cause the processing circuit to process database information comprising records corresponding to events in a geographic area. The logic may be further operative to cause the processing circuit to train a machine learning model having features based in part on user preference data. The features corresponding to attributes of the records in the database information. The user preference data may be based on user availability data and user activity data stored in various applications. The logic may be further operative to cause the processing circuit to identify records having events of interest based upon the machine learning model. Each of the events of interest includes attributes that map to corresponding attributes of at least a portion of the user preference data. The logic may be further operative to cause the processing circuit to generate recommendation data for one or more events in the identified records. The logic may be further operative to cause the processing circuit to display, on a display device, the recommendation data and a selectable option for each event of the one or more events. The logic may be further operative to cause the processing circuit to store one or more entries in a calendar application based upon one or more user selections for the displayed recommendation data. Other embodiments are described and claimed.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

BRIEF DESCRIPTION OF THE DRAWINGS

FIG. 3 illustrates an embodiment of a user interface for the system of FIG. 1.

FIG. 5 illustrates an embodiment of a logic flow for the system of FIG. 1.

FIG. 6 illustrates an embodiment of a second logic flow for the system of FIG. 1.

DETAILED DESCRIPTION

Figure 1:
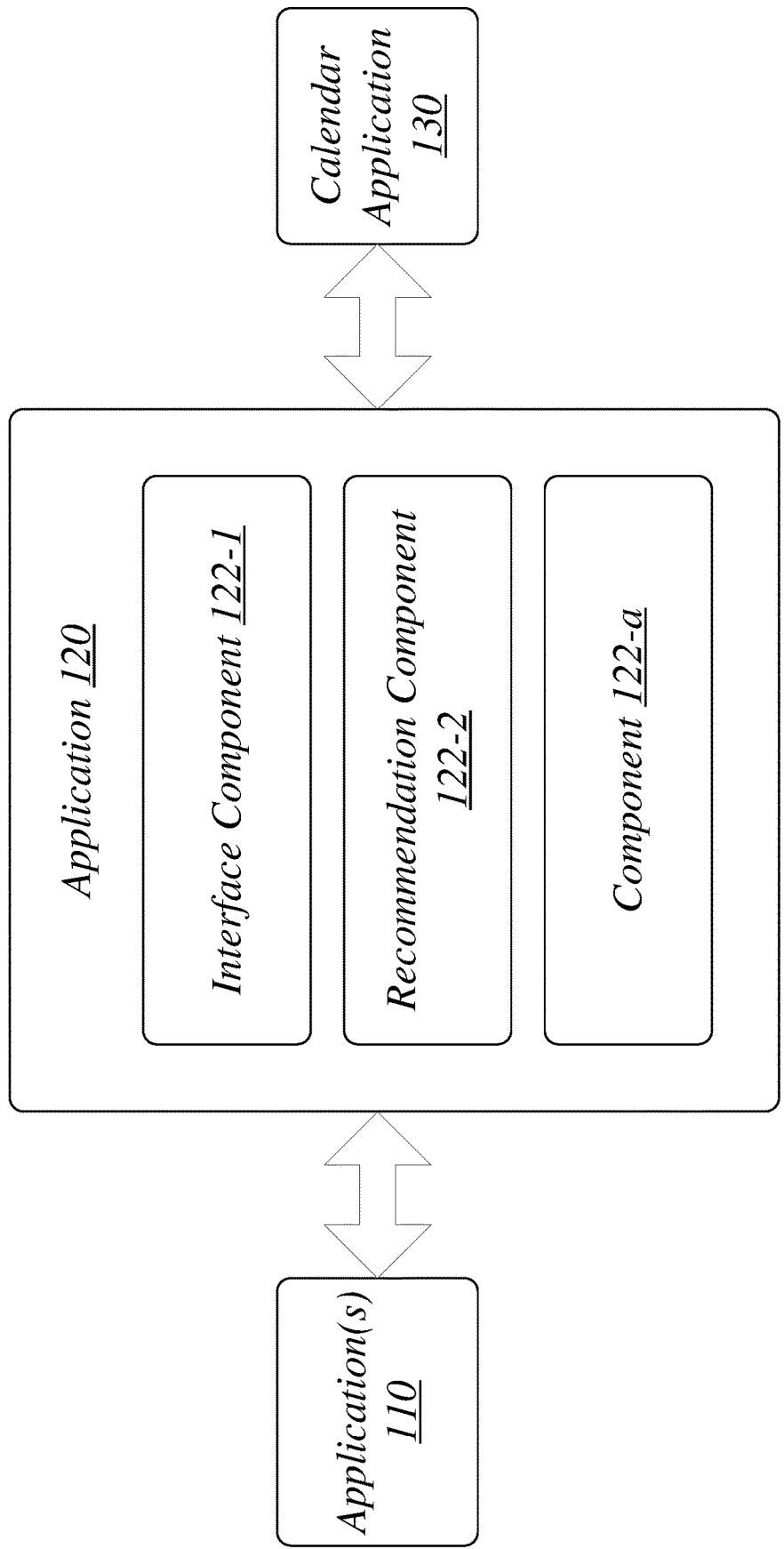
FIG. 1 illustrates an embodiment of a system to apply machine learning to schedule events of interest.

Various embodiments are directed towards applying machine learning to schedule events of interest for a device user. A system implementing at least one embodiment may recommend and, possibly, schedule events for the device user in a manner similar to scheduling for devices. There may be a number of applications operating on the device and storing a considerable breadth of datasets. The system may operate on these datasets to identify events with activities that the user is likely to engage in at a future date and time based upon similar activities among the user's historical events. By recommending these events via a Graphical User Interface (GUI), the device user can view information about these events and then, decide which event(s) may enhance their overall experience. More importantly, the device user is given a choice of events from a limited number instead of all the possible events with information in the above-mentioned datasets.

Without the benefit of the present disclosure, there are a number of inefficiencies frustrating the scheduling of events of interests. The device user must engage with conventional technologies, which at best allow the device user to perform basic data manipulation tasks such as searching or sorting by keyword. Otherwise, the device user must physically examine an overwhelming number of communications (e.g., email messages) and/or notifications (e.g., mobile application notifications) to identify and schedule events of interests. Unless the device user entered specific phrasing and/or knew exactly what interested them, it is difficult and time-consuming for that device user to find events of interest.

The present disclosure, in general, introduces embodiments leveraging concepts of machine learning in an application enhancing the scheduling of events of interest. A machine learning model can be trained to eliminate noise in the form of communications and/or notifications without events of interest. The machine learning model as described herein is not merely a tool and forms at least a portion of the technology configured for identifying events of interest. Furthermore, the techniques in the present disclosure are applicable to scheduling events of interest for machines. A schedule with events of interests created in a manner described herein is similar to a schedule for a device. For one, events for either schedule are found by searching through an overwhelming amount of information. Therefore, the machine learning model can be used in organizing events of interests for devices.

With general reference to notations and nomenclature used herein, the detailed descriptions which follow may be presented in terms of program processes executed on a computer or network of computers. These process descriptions and representations are used by those skilled in the art to most effectively convey the substance of their work to others skilled in the art.

A process is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein which form part of one or more embodiments. Rather, the operations are machine operations. Useful machines for performing operations of various embodiments include general purpose digital computers or similar devices.

Various embodiments also relate to apparatus or systems for performing these operations. This apparatus may be specially constructed for the required purpose or it may comprise a general-purpose computer as selectively activated or reconfigured by a computer program stored in the computer. The processes presented herein are not inherently related to a particular computer or other apparatus. Various general-purpose machines may be used with programs written in accordance with the teachings herein, or it may prove convenient to construct more specialized apparatus to perform the required method steps. The required structure for a variety of these machines will appear from the description given.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well-known structures and devices are shown in block diagram form in order to facilitate a description thereof. The intention is to cover all modifications, equivalents, and alternatives consistent with the claimed subject matter.

FIG. 1 illustrates a block diagram for a system 100. In one embodiment, the system 100 may comprise a computer-implemented system 100 having a software application 120 comprising one or more components 122-a. Although the system 100 shown in FIG. 1 has a limited number of elements in a certain topology, it may be appreciated that the system 100 may include more or less elements in alternate topologies as desired for a given implementation.

It is worthy to note that "a" and "b" and "c" and similar designators as used herein are intended to be variables representing any positive integer. Thus, for example, if an implementation sets a value for a=5, then a complete set of components 122-a may include components 122-1, 122-2, 122-3, 122-4 and 122-5. The embodiments are not limited in this context.

The system 100 may comprise the application 120. As mentioned above, the system 100 includes the application 120 as a type of software application running on an electronic device, such as a desktop application running on an operating system of a computing device, a mobile application running on a mobile operating system of a mobile device, or a web application running on a browser component of either the mobile operating system or the desktop operating system. Those skilled in the art would understand how to design, build, and deploy the software application on any type of electronic device.

The application 120 may be generally arranged to process input 110 of which some input may be provided directly to an interface component 122-1 via an input device, and other input may be provided to the interface component 122-1 via a network. For example, a user may enter data via a keyboard device attached to a computing device running the application 120. As another example, the user may provide input (e.g., gesture and/or speech commands) through various sensor devices operating a Natural User Interface (NUI). The application 120 may be generally arranged to generate output 130 for the interface component 122-1 of which some output may be configured for display on a display device, and other output may be communicated across the network to other devices. As an example, the application 120 may generate data that can be processed/rendered by the interface component 122-1 into content for a Graphical User Interface (GUI).

The application 120 may be generally arranged to provide a device user or users with various services; among the provided services, the application 120 may provide the device user with a recommendation component 122-2 operative to identify events of interests in which the device user may possibly engage. These events of interests are based upon the device user's past behavior, and therefore, the recommendation component 122-2 is customized for the device user's specific interests or preferences.

The device user's past behavior may be partitioned into user activity data and user availability data, identifying which activities the device user engages in and when are these activities engaged in by the device user, respectively. By clustering the device user's activities (possibly in combination with other user's activities), the recommendation component 122-2 defines discrete attribute types, such as time slots and activity categories. To illustrate by way of example, the recommendation 122-2 may identify (via location data) that the device user is at the gym and is exercising. While the device user may go to the gym to do something besides exercising, if a considerable number of instances occur where the device user is exercising at the gym, the recommendation component 122-2 establishes an activity attribute of "exercising at the gym." It is appreciated that the recommendation component 122-2 may employ a number of mechanisms to establish additional attributes.

The recommendation component 122-2 may apply machine learning techniques to build/train a machine learning model from the device user's user activity data and/or the user availability data. The recommendation component 122-2 may cluster the user activity data and/or the user availability data in various ways to determine at least one time attribute and at least one activity attribute with frequencies above a threshold value. For example, the recommendation component 122-2 may identify a particular time slot (e.g., seven (7) pm-eight (8) pm) where the device user engages in a certain activity (e.g., exercising at the gym). The machine learning model may indicate that a time slot with a highest likelihood for the certain activity (e.g., exercising at the gym) is the particular time slot (e.g., seven (7) pm-eight (8) pm) and/or an activity with a highest likelihood for the particular time slot (e.g., seven (7) pm-eight (8) pm) is the certain activity (e.g., exercising at the gym). Therefore, the recommendation component 122-2 may recommend an event if that event's description indicates an activity similar to the certain activity (e.g., exercising at the gym) and occurs at or close to the particular time slot (e.g., seven (7) pm-eight (8) pm). The recommendation component 122-2 may rely on the machine learning model to correlate the event description to various attributes of events of interest.

It is appreciated that the event description refers to any information corresponding to the recommended event. The application 120 may access this information via a number of techniques. For example, the application 120 running on a mobile device may access the information from text presented in a mobile application or a web site (e.g., an Internet blog). The recommendation component 122-2 may partition the text into tokens, form groupings of tokens (e.g., into phrases), and then map those groupings of tokens to attributes. Some of those attributes indicate "exercising at the gym" as an activity and physical fitness as an activity category. The event description may expressly state "exercising at the gym" or imply "exercising at the gym" by way of other words. Alternatively, the event description may relate to physical fitness in general and form a secondary association with "exercising at the gym." The recommendation component 122-2 leverages machine learning to determine whether the event description includes the various attributes of events of interest.

In some embodiments, the system 100 leverages a natural language processing (NLP) mechanism to apply various techniques in order to generate for interpreting raw data and understanding content in that raw data. Applying these techniques, the system 100 generates the event description as a vector of attribute data learned from such raw data. The present disclosure envisions raw data as including any form of content from which a contextual meaning can be determined.

Consider an example where content on a mobile device presents information about an informational seminar. The system 100 may invoke various techniques to analyze that content and extract various attributes describing the informational seminar, such as by partitioning textual information into tokens and mapping groups of tokens into a title, a topic, a keynote speaker, a venue, and/or pieces of information. Based upon these tokens, the system 100 forms the event description as a vector combining the various attributes such as an activity attribute, a date attribute, a location attribute, an event leader attribute, and/or the like. To illustrate an example event description, an example activity attribute, an example location attribute, and an example event leader attribute may refer to the topic or the title of the informational seminar, the venue, and the keynote speaker, respectively.

The system 100 may invoke a variety of techniques to determine the title or the topic for the activity attribute. In one embodiment, the system 100 identifies the title based upon a placement in the content. In one embodiment, the system 100 identifies the topic using NLP techniques or text summarization techniques. An example text summarization technique may utilize a deep learning construct (e.g., a recurrent neural network) to extract semantic features and derive meaning from the information associated with the informational seminar.

In another embodiment, the system 100 may determine the title or topic based upon certain keywords and use that title or topic for the activity attribute. A word-frequency model can be used to determine whether an n-gram of words is a keyword for a particular title or topic of interest. In some embodiments, the word-frequency model may indicate a probability or likelihood of finding the keyword in a description about the particle title or topic of interest. If a word or word combination in the content for the informational seminar has a frequency for the particular topic or title exceeding a threshold value, the word or word combination is a keyword and the informational seminar is directed towards the particular title or topic of interest. Hence, that particular title or topic of interest may be used as the activity attribute in the event description for the informational seminar. It is appreciated that the present disclosure does not foreclose on using an alternative technique to determine the activity attribute for the event description. It is further appreciated that the system 100 may identify other attributes based upon keywords in the content for the informational seminar, such as the location attribute, a date/time attribute, an event leader attribute, and/or the like.

The system 100 compares the event description to the device user profile defining the device user's preferences. This device user profile may be a vector of attribute data that is distilled from the above-mentioned machine learning model that is built/trained from the device user's user activity data and/or the user availability data. The system 100 may use a metric (e.g., a cosine similarity metric) to compare the event description for the informational seminar to the device user profile. If the machine learning model indicates a frequency or probability that the device user attends events with neural networks as a topic of interest, the device user's profile may have neural networks as an activity attribute. If, for instance, the informational seminar relates to generative adversarial networks, the system 100 identifies the informational seminar as an event of interest.

Figure 2:
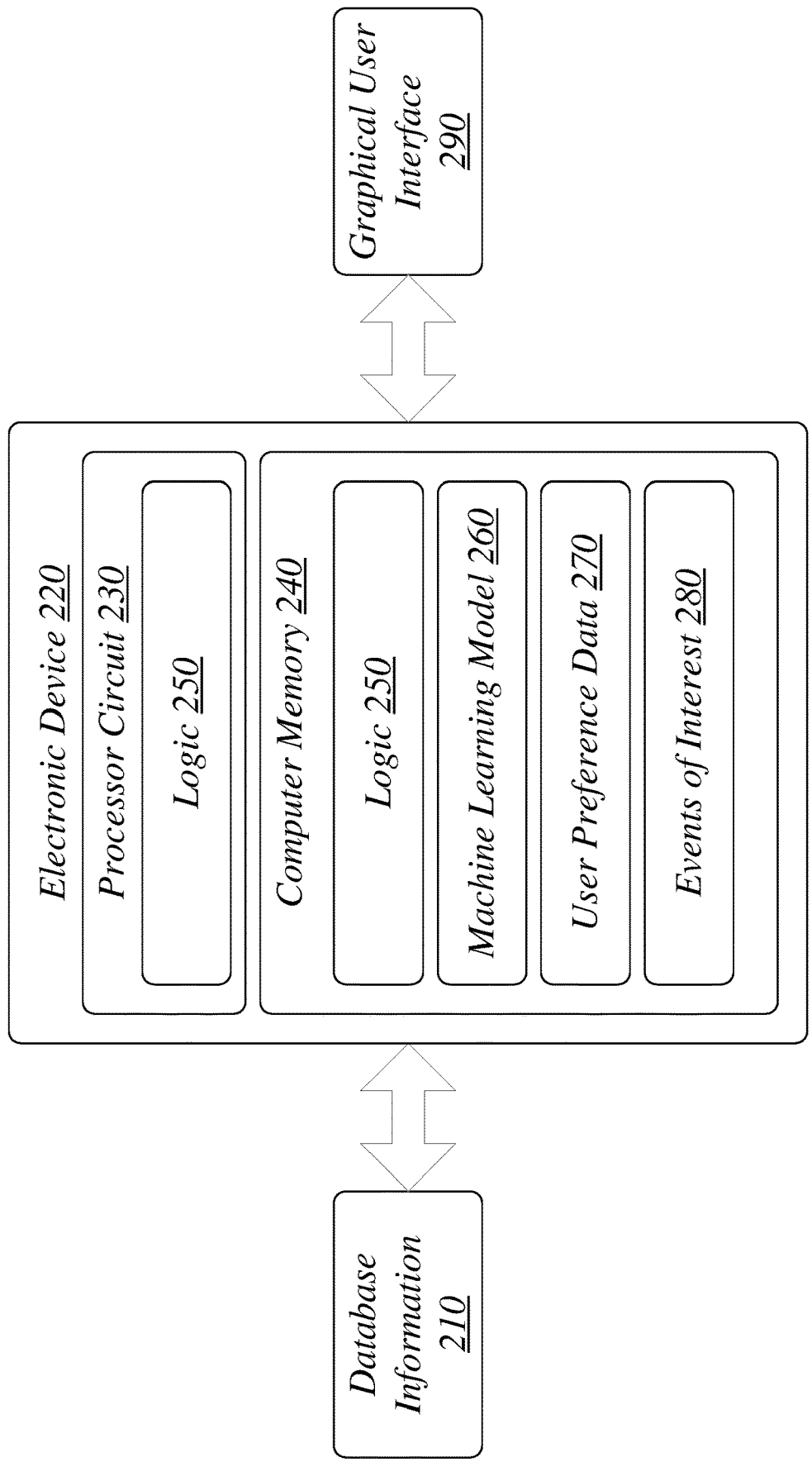
FIG. 2 illustrates an embodiment of an apparatus for the system of FIG. 1.

FIG. 2 is a block diagram of an apparatus 200 for the system 100. As shown in FIG. 2, the apparatus 200 includes an electronic device 220 or (simply) device 220.

The device 220 may be communicably coupled to a database system maintaining records in database information 210. At least some of these records correspond to events such that a record's attribute data describes an event including that event's activity, time, date, location, contact person/event leader, and/or the like.

The device 220 includes a processing circuit 230 and computer memory 240. The device 220 further includes logic 250 stored in the computer memory 240 and executed on the processing circuit 230. The logic 250 may be operative to cause the processing circuit 230 to automatically add events of interest to the user's calendar application.

In some embodiments, the logic 250 is operative to cause the processing circuit 230 to process the database information 210 comprising records corresponding to events in a geographic area as well as records corresponding to events engaged by a device user. The system 100 may employ various web crawler and data scraper programs to generate the records in the database information 210. As described herein, these data crawler/scraper programs identify these events by examining almost every structured dataset stored in the computer memory 240 of the device 220 as well as in storage devices of web servers. Applications running on the device 220 produce structured datasets that can be extracted and analyzed for user activity data and user availability data. A calendar application typically includes the device user's scheduled activities as well as availability for new events.

In some embodiments, the logic 250 is operative to cause the processing circuit 230 to train a machine learning model 260 having features based in part on user preference data 270. In general, the user preference data 270 is based on user availability data and user activity data, which are stored in various applications. The features in the machine learning model 260 correspond to attributes of the records in the database information 210 such that a same or similar system defines attribute data for both the records in the database information 210 and the features in the machine learning model 260. An example set of features for an event includes feature values for a set of attributes (e.g., an activity attribute, a location attribute, a time attribute, and/or the like), and the machine learning model 260 specifies a set of weights to combine with the feature values into a weighted average indicating a likelihood that an event is an event of interest. It is appreciated that there are a number of other implementations for the machine learning model 260 to properly determine a likelihood that the event is an event of interest.

In some embodiments, the above-mentioned feature values refer to probabilities (e.g., conditional probabilities) and each probability relates to an event of interest given an attribute or set of attributes. To illustrate, an example feature value includes a probability ($p(y|x)$) that an event is an event of interest given an activity attribute of "exercising at the gym" and/or a time attribute of 7 pm. This example feature value may be weighted by the machine learning model 260 along with any other feature used in determining a likelihood regarding whether an event is an event of interest. It is appreciated that the machine learning model 260 may configure the example feature value to be set according to a function evaluating the probability that the event is an event of interest given the activity attribute of "exercising at the gym" and/or the time attribute of 7 pm.

It is further appreciated that the example feature value may be mathematically combined with other features of which one or more may not map to corresponding attribute data in the user preference data 270. An example feature value may represent a quality of other events in the same geographic area. For instance, if the records in the database information 210 include a considerable number of events of interest (e.g., exceeding a threshold value), the logic 250 may add a weight representing a quality of another choice. This weight may decrease the likelihood that the event is an event of interest. The logic 250 also may increase a predefined threshold for determining events of interest.

In some embodiments, the logic 250 is operative to cause the processing circuit 230 to identify one or more records in the database information 210 having events of interest based upon a machine learning model 260. Each of the identified events of interest include attributes that map to corresponding attributes of at least a portion of the user preference data 270. To accomplish such a mapping, the user preference data 270 may include clusters of event attribute data including historical event attribute data but not excluding scheduled activities occurring in the future. An example implementation of the user preference data 270 defines a cluster to include a probability distribution of events given one or more attributes where at least one cluster may indicate an activity (or group of activities) engaged in by the device user beyond a threshold. The user preference data 270 may include at least one cluster indicating a time slot favored by the device user of which a cluster may indicate a time slot favored by the device for user for engaging in the above-mentioned activity. For this specific cluster, the machine learning model 260 may configure an example feature. By clustering the device user's historical events and identifying specific attributes (e.g., activity attributes), the machine learning model 260 may define the features in terms of the specific attributes. The machine learning model 260 may further include at least one metric for evaluating an event's attribute data, such as a metric for measuring the event's similarity to the activity mentioned above.

Hence, the features representing the user's preferences may be categorized as representing user availability, user activity, or both user availability and user activity. An example availability feature may be based upon an event's time attribute and a parameter/weight associated with this feature represents an importance of the time attribute in determining whether a particular event is an event of interest to recommend to the device user. The machine learning model 260 assigns values to each time attribute (e.g., time slot such as 7 pm-8 pm) where each value indicates the user's penchant for that time attribute. The magnitude of the value represents a likelihood that the user is going to engage in an event given that the event takes place at the time attribute. Another example availability may be a location attribute. An example activity feature may be based upon the particular event's activity or activity type attribute, and a parameter/weight associated with this feature represents an importance of the activity or activity type on determining whether to recommend the particular event. The machine learning model 260 assigns a value indicating the user's penchant for that activity. Another possible feature may be based upon both user availability and user activity such that a parameter value associated with this feature may represent the user's penchant for a certain activity at a certain time/date. It is appreciated that the machine learning model 260 may assign values based upon probabilities (e.g., frequencies) and/or mathematical functions.

There are a number of additional features that can be used to build and training the machine learning model 260. Other example features include Boolean variables, such example features regarding whether the event description 330 refers to a recurrent event, whether food and refreshments will be available to attendees, whether a friend from the device user's social media connections will also be an attendee to the event. The device user may be interested in a regularly scheduled meeting with other folks in the same area to discuss emerging topics in an area of interest. Another example feature may indicate an average number of attendants of the event (i.e., popularity).

In general, events of interest correlate to sets of event attributes and the machine learning model 260 expresses such correlations mathematically, for example, via a probability distribution or a mathematical function. The logic 250 invokes the machine learning model 260 to determine whether an event correlates to the events of interest as indicated by the user preference data 270. When given the above-mentioned event's attribute data, the machine learning model 260 provides a prediction as to whether the event's attribute data correlates with an event of interest. A prediction (i.e., label) y and a feature set $x_i$ are used in one example probability model such that $p(y|x)$ indicates a probability of the prediction y given the feature set $x_i$; for example, p(y|x) could translate into the probability or likelihood that an event is to be labeled an event of interest given the event's attribute data and, conversely, p(x|y) could translate into the probability or likelihood that an event of interest includes the event's attribute data. The probabilities p(x|y) and p(y|x) form part of a probability distribution and, as training progresses, are adjusted to better reflect the actual distribution of events of interest and increase an accuracy of future event of interest predictions. Alternatively, a prediction (i.e., label) y and a feature set $x_i$ are used in an example function y=f(x) where f(x) produces a value (e.g., a weighted average of the feature set $x_i$). For instance, if the value exceeds a threshold, the event is labeled an event of interest given the event's attribute data.

In some embodiments, the logic 250 is operative to cause the processing circuit 230 to generate recommendation data for one or more events in the identified records (i.e., events of interests). The recommendation data, in general, refers to an arrangement of information describing the attribute data for the one or more events in the identified records. In some embodiments, the logic 250 generates the recommendation data as an element of a Graphical User Interface (GUI) 290 where that element presents information about a particular event. In some embodiments, the logic 250 is operative to cause the processing circuit 230 to display, on a display device, the recommendation data and a selectable option for each event of the one or more events.

The logic 250, in at least one embodiment, invokes the machine learning model 260 to transform input data (e.g., record(s) having event data) into output data comprising a prediction as to whether that input data indicates one or more events of interest 280 for the device user. Based upon a given event's attribute data indicating various activity features and/or availability features (i.e., input variables $x_i$), the machine learning model 260 can produce a probability or another numerical value indicating whether that event is an event of interest (i.e., output variable y). This probability or other numerical value may result from a probability distribution or a mathematical function, respectively, indicating whether the event's attribute data matches feature data corresponding to the user preference data 270. It is appreciated that the logic 250 may implement the machine learning model 260 in a number of ways, such as a naïve-Bayes classifier (or another probabilistic statistical classifier), an artificial neural network (or another deep learning network), or another type of model. Because the machine learning model 260 is implemented using features extracted from the user preference data 270, the machine learning model 260 may identify relationships/patterns in the user availability data and/or the user activity data. At the very least, these identified relationships/patterns reflect preferred activities and/or activity times such that the above-mentioned probability or other numerical value may indicate a magnitude or degree that the given event complements those preferred activities and/or activity times. If this probability or other numerical value exceeds a pre-defined threshold value, the logic 250 identifies the given event as an event of interest to recommend to the device user via the above-mentioned recommendation data.

Once a configurable number of events of interest are identified, the logic 250 displays, in the GUI 290, information regarding those events of interest in a portal with a selectable option for each event of interest. Invoking the selectable option selects the corresponding event of interest. The logic 250 may execute various tasks in response to one or more user selections of those selectable options. Some of the various tasks involve modifying applications of the apparatus 200. A user selection of an event of interest being displayed in the GUI 290 prompts the logic 250 to store information associated with the selected event of interest in one or more appropriate applications operating on the device 220.

In some embodiments, the logic 250 is operative to cause the processing circuit 230 to store one or more entries in a calendar application based upon one or more user selections for the displayed recommendation data. An example entry corresponds to a selected event's date and time attributes and includes information associated with that event, such as location information, participant information (e.g., event coordinator or leader) and/or the like. In some embodiments, the logic 250 is operative to cause the processing circuit 230 to extract, from the identified records, a date attribute and a time attribute for an event corresponding to one of the user selections and insert indicia into a portion of a calendar graphic according to the date attribute and the time attribute.

In some embodiments, the logic 250 is operative to cause the processing circuit 230 to extract, from the identified records, an address attribute for an event corresponding to one of the user selections and insert the address attribute into a contacts data store of a contacts application. In some embodiments, the logic 250 is operative to cause the processing circuit 230 to extract, from the identified records, an address attribute for an event corresponding to one of the user selections and instructs a communication application to generate a communication comprising the address attribute. As an example, the communication application may communicate a message (e.g., an email message) to a participant or event leader.

FIG. 3 illustrates an embodiment of a user interface 300 for the system 100. The user interface 300 may be produced by an operating system of a mobile device to be an example representation of the GUI 290 of FIG. 2. As shown in FIG. 3, the user interface 300 includes a number of elements and other components. Some user interface (UI) elements function as icons for different applications in use by the mobile device.

One UI element includes a dialog box displaying recommendation data for an event in the form of a recommendation 320 comprising the event's attribute data as well as selectable options for different tasks. As depicted in FIG. 3, the event's attribute data is configured into an event description 330 displaying an event in general (Dr. Neil Degrasse Tyson AstroPhysics Program), an event leader (Chuck Nice), a date (Tuesday, Jul. 1, 2019), a time (7 pm), and a location (New York City, N.Y. Planetarium).

Leveraging a machine learning model, the system 100 has identified the event in the recommendation 320 as being an event of interest for the mobile device user. In some embodiments, the machine learning model includes a probability distribution (p(y|x)) or a mathematical function (y=f(x)) that compares the above-mentioned event's attribute data to attributes corresponding to events of interest based upon user preference data, particularly user activity data and user availability data. Having the user preference data as an initial training set, the system 100 builds the machine learning model to determine whether the mobile device user may prefer to attend a given event based upon that given event's attribute data. For example, the machine learning model may indicate a proclivity on the mobile device user for Planetariums in general and/or the specific Planetarium in NYC. The machine learning model may determine such a proclivity when the mobile device user visits Planetariums in general and/or the specific Planetarium in NYC at a probability/frequency exceeding a threshold value. If the machine learning model includes a mathematical function, the machine learning model may use a metric to translate the probability/frequency into a weighted function value. Based upon the probability/frequency and/or the weighted function value, the system 100 determines that, given the event's attribute data, the event to the AstroPhysics show is an event of interest to recommend to the mobile device user.

It is appreciated that a plurality of applications 340 may provide at least some of the user preference data. The user activity data (e.g., logged location data) provided by the plurality of applications 340 may indicate that the device user attends activities at the specific Planetarium in NYC at a higher frequency than other activities. The user availability data (e.g., historical calendar data) may corroborate this frequency. Hence, a location attribute (specific Planetarium in NYC) and one or more time attributes (7 pm, Tuesday, July) may map to favorable locations and times for the mobile device user, as indicated by the user preference data. The machine learning model may translate these attributes into values (e.g., probabilities) that are higher than values assigned to other location and time attributes. The machine learning model includes functionality to combine these values and compare that combined value to a metric for determining whether to recommend the AstroPhysics program as an event of interest.

As described herein, the system 100 may apply a clustering technique to the user's historical events where each cluster refers to an abstract activity type attribute. In this manner, various activities and sub-activities are grouped with an appropriate activity type to ensure similar treatment under the machine learning model. In addition, slight differences between activities are abstracted out to ensure a proper comparison. For instance, the AstroPhysics program may be an activity/sub-activity under an umbrella of Planetarium-related activities. An activity attribute of "AstroPhysics Program" may map to a generic attribute representing various "Planetarium-related activities"; because those the mobile device user frequently engages in such activities, the machine learning model may assign a value higher than other activities. If the values assigned to the "AstroPhysics Program" event attribute exceeds a threshold, the system 100 generates the recommendation 320. Hence, the machine learning model is configured to favor or increase events of interest that involve Planetariums, thereby enhancing the mobile device user's mobile experience with functionality capable of identifying such events of interest to add to the mobile device.

In some embodiments, the system 100 may implement the machine learning model using one or more additional features. One example feature may be based upon the user availability data provided by a calendar application 3405 regarding whether there is an open slot or a closed slot in a schedule at a same set of date and time attributes (Jul. 1, 2019 at 7 pm) as in the event description 330. Some device users may select the recommendation 320 only if there is an open slot in the schedule while other users are willing to select the recommendation 320 even there is a closed slot. Yet another feature may indicate a level of importance placed by the device user on the availability of the time slot at the set of date of time attributes.

The recommendation 320 further includes elements (e.g., checkboxes) operating as selectable options for the event. Each selectable option corresponds to at least one task, such as saving the event in the calendar application, sending an email to Event Leader, saving the Event Leader as a contact (in a contacts component of the mobile device), and/or the like.

In some embodiments, one or more user selections of one or more selectable options provide feedback to the system 100. The event description 330 in the recommendation 320 may be assigned a highest likelihood at a present time but the assigned likelihood is subject to change at least in response to feedback. As an example, the system 100 may adjust weights in the machine learning model based upon such feedback. If the user decides not to select the recommendation 320, the machine learning model adjusts (e.g., lowers) the assigned likelihood for the event description 330. Similar events to the recommendation 320 also may have their assigned likelihood adjusted (e.g., lowered). As another example, the system 100 may adjust a threshold value for comparison with the assigned likelihood. The system 100 may adjust the threshold value based upon applicable metrics for determining an accuracy of the recommendation 320, such as recall, precision, F1score, and/or the like. Precision may be computed as a ratio of correction recommendations to total recommendations. Recall may be computed as a ratio of correct recommendations to a total number of possible events of interest. The F1score may be a result of dividing a product of recall and precision by a sum of recall and precision (e.g., (recall·precision)/(recall+precision)).

Figure 4:
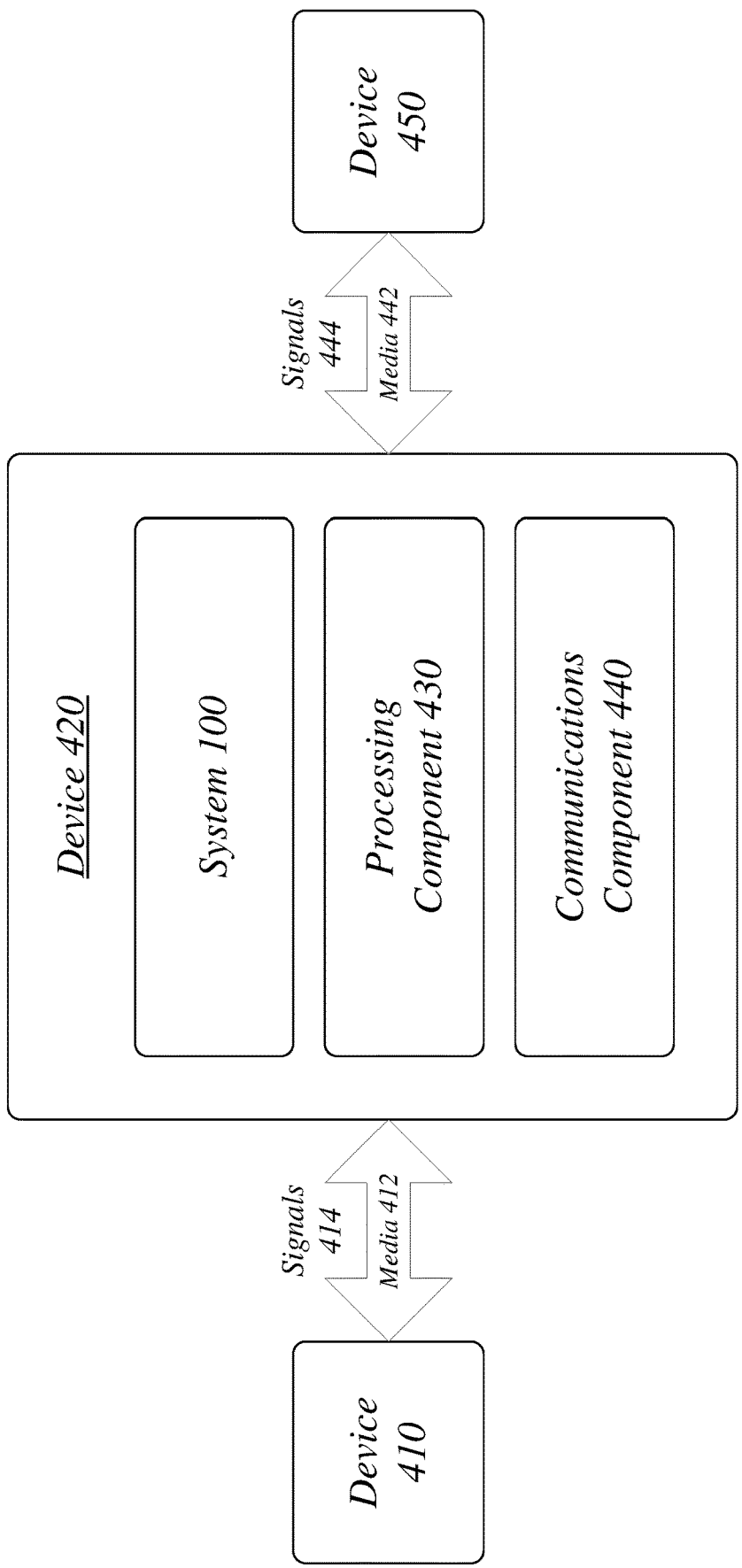
FIG. 4 illustrates an embodiment of a centralized system for the system of FIG. 1.

FIG. 4 illustrates a block diagram of a centralized system 400. The centralized system 400 may implement some or all of the structure and/or operations for the system 100 in a single computing entity, such as entirely within a single device 420.

The device 420 may comprise any electronic device capable of receiving, processing, and sending information for the system 100. Examples of an electronic device may include without limitation an ultra-mobile device, a mobile device, a personal digital assistant (PDA), a mobile computing device, a smart phone, a telephone, a digital telephone, a cellular telephone, ebook readers, a handset, a one-way pager, a two-way pager, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, game devices, television, digital television, set top box, wireless access point, base station, subscriber station, mobile subscriber center, radio network controller, router, hub, gateway, bridge, switch, machine, or combination thereof. The embodiments are not limited in this context.

The device 420 may execute processing operations or logic for the system 100 using a processing component 430. The processing component 430 may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), Application-specific Standard Products (ASSPs), System-on-a-chip systems (SOCs), Complex Programmable Logic Devices (CPLDs), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, processes, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The device 420 may execute communications operations or logic for the system 100 using communications component 440. The communications component 440 may implement any well-known communications techniques and protocols, such as techniques suitable for use with packet-switched networks (e.g., public networks such as the Internet, private networks such as an enterprise intranet, and so forth), circuit-switched networks (e.g., the public switched telephone network), or a combination of packet-switched networks and circuit-switched networks (with suitable gateways and translators). The communications component 440 may include various types of standard communication elements, such as one or more communications interfaces, network interfaces, network interface cards (NIC), radios, wireless transmitters/receivers (transceivers), wired and/or wireless communication media, physical connectors, and so forth. By way of example, and not limitation, communication media 412, 442 include wired communications media and wireless communications media. Examples of wired communications media may include a wire, cable, metal leads, printed circuit boards (PCB), backplanes, switch fabrics, semiconductor material, twisted-pair wire, co-axial cable, fiber optics, a propagated signal, and so forth. Examples of wireless communications media may include acoustic, radio-frequency (RF) spectrum, infrared and other wireless media.

The device 420 may communicate with other devices 410, 450 over a communications media 412, 442, respectively, using communications signals 414, 444, respectively, via the communications component 440. The devices 410, 450 may be internal or external to the device 420 as desired for a given implementation.

As an alternative, the system 100 may be implemented as a distributed system. The distributed system may distribute portions of the structure and/or operations for the system 100 across multiple computing entities. Examples of distributed system may include without limitation a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

FIG. 5 illustrates one embodiment of a logic flow 500. The logic flow 500 may be representative of some or all of the operations executed by one or more embodiments described herein.

In the illustrated embodiment shown in FIG. 5, the logic flow 500 processes database information comprising records corresponding to events at block 502. For example, the database information (e.g., the database information 210 of FIG. 2) may include records of events occurring in a geographic area. Such database information may be provided (in record form) by a server configured to maintain such information. In addition, information stored on a device by the device's user(s) may be used to further build the database information with records of events occurring in the geographic area. It is appreciated that some events are historical events and other events occur some time in the future. Some events are scheduled events on the device. The logic flow 500 may employ a number of data scraper/web crawler programs to process data items and generate records of events where each record is at least an event description. The logic flow 500 may employ a number of mechanisms to map one or more tokens of the event description to event attribute data.

The logic flow 500 may train a machine learning model at block 504. For example, the logic flow 500 may employ an artificial intelligence library (e.g., application programming interface (APIs)) implementing functionality to build the machine learning model from feature information and a training set. The logic flow 500 may use this library to generate machine learning constructs from clusters of historical events where each cluster corresponds to an attribute and a probability distribution for that attribute, identifying probabilities for events according to their additional attributes. These constructs build a feature set to include at least the clusters and their probability distributions as feature values. The machine learning model also defines a (type) system for event attribute data such that the clustering of the event attribute data further operates to identify additional attribute classifications for the type system mentioned herein. When a sufficient number of events include a specific activity, the logic flow 500 may define a new activity attribute for the specific activity to at least enable comparison between these events of events with other activity attributes.

The logic flow 500 may identify records having events of interest based upon the machine learning model at block 506. The logic flow 500 may operate on the records in the database information and use the machine learning model to determine whether a record describes an event of interest. For example, if an event in the same geographic area has a likelihood of being an event of interest beyond a pre-defined threshold, the logic flow 500 may establish that event as an event of interest to recommend to the device user.

The logic flow 500 may operate in real-time such as when the logic flow 500 is in operation on a mobile device (e.g., as part of a mobile application). The logic flow 500 may identify a possible event of interest from various data in use by applications running on the mobile device. For example, the logic flow 500 may extract an event description from notifications (e.g., feeds) and use the machine learning model to determine whether the event description includes an actual event of interest.

The logic flow 500 may generate recommendation data for the events of interest and display, on a graphical user interface (GUI), the recommendation data and a selectable option for each event of interest at block 508. For example, the logic flow 500 may generate a GUI element (e.g., a text box) with recommendation data such that the GUI element changes for each event of interest. The GUI element includes sub-elements to operate as selectable options that allow the device user to select the recommended event of interest and perform various tasks.

The logic flow 500 may store one or more entries in a calendar application at block 510. For example, in response to the device user's selection of an event of interest, the logic flow 500 may extract a time attribute and a date attribute and instruct the calendar application to insert indicia into a calendar graphic at the same time attribute and date attribute. The logic flow 500 may instruct another application (e.g., a communication application) to perform various tasks using attribute data from the selected event of interest. It is appreciated that the logic flow 500 may further update the machine learning with the device user's selected event of interest. The embodiments are not limited to this example.

FIG. 6 illustrates one embodiment of a logic flow 600. The logic flow 600 may be representative of some or all of the operations executed by one or more embodiments described herein.

In the illustrated embodiment shown in FIG. 6, the logic flow 600 may group historical events into clusters at block 602. For example, the logic flow 600 may sort the historical events by one or more attribute types, partition the sorted list of historical events based upon discrete attributes, and determine a probability distribution for each attribute type. Therefore, a cluster may group historical events sharing a specific attribute and include an associated distribution of conditional probabilities for these events given the specific attribute.

The logic flow 600 may map an event description to attribute data at block 604. For example, the logic flow 600 may parse the event description into tokens and identify mappings between groups of tokens to attribute types. By way of such mappings, the logic flow 600 is identifying at least one attribute being described in a text of a group of tokens.

The logic flow 600 may compare attribute data of an event to the clusters and determine a likelihood that the event is an event of interest at block 606. For example, the logic flow 600 may identify a cluster of historical events having a particular activity attribute. The text used activities in the clustered historical events may match the text used in the event description; and for at least that reason, the logic flow 600 may identify the event as being a possible event of interest. Other attributes in the event description may map to at least one of the clustered historical events and indicate an initial probability of the event being an event of interest. In some embodiments, the logic flow 600 uses the initial probability as one feature value and, in combination with other feature values, determine a likelihood that the event is an actual event of interest. It is appreciated that the present disclosure does not foreclose on any methodology applicable in this instance to determine the appropriate likelihood for the event. Hence, the logic flow 600 may employ a machine learning model (e.g., a Bayes classifier, an artificial neural network, and/or the like) to determine, for the feature values, a mathematical distribution (e.g., of probabilities or other values) indicating the likelihood for the event of interest.

The logic flow 600 may compare the event to user availability data to determine whether there is an open time slot in a calendar application at block 608. For example, the logic flow 600 may be configured to recommend an event to the device user if there is an open time slot in the calendar application. In another example, the logic flow 600 may be use availability of the time slot as a feature value in determining whether the event is an actual event of interest to recommend to the device user. There may be an open time slot corresponding to a threshold value and the closed time slot corresponding to another threshold value. If the event corresponds to the open time slot and the likelihood of the event that exceeds the threshold value, the logic flow 600 stores an entry in a calendar application. If the event corresponds to the closed time slot and the likelihood exceeds the other threshold value, the logic flow 600 generate a recommendation for the event, display the recommendation in a dialog box, and in response to a selection of the recommendation, store an entry in the calendar application of the event. The embodiments are not limited to this example.

Figure 7:
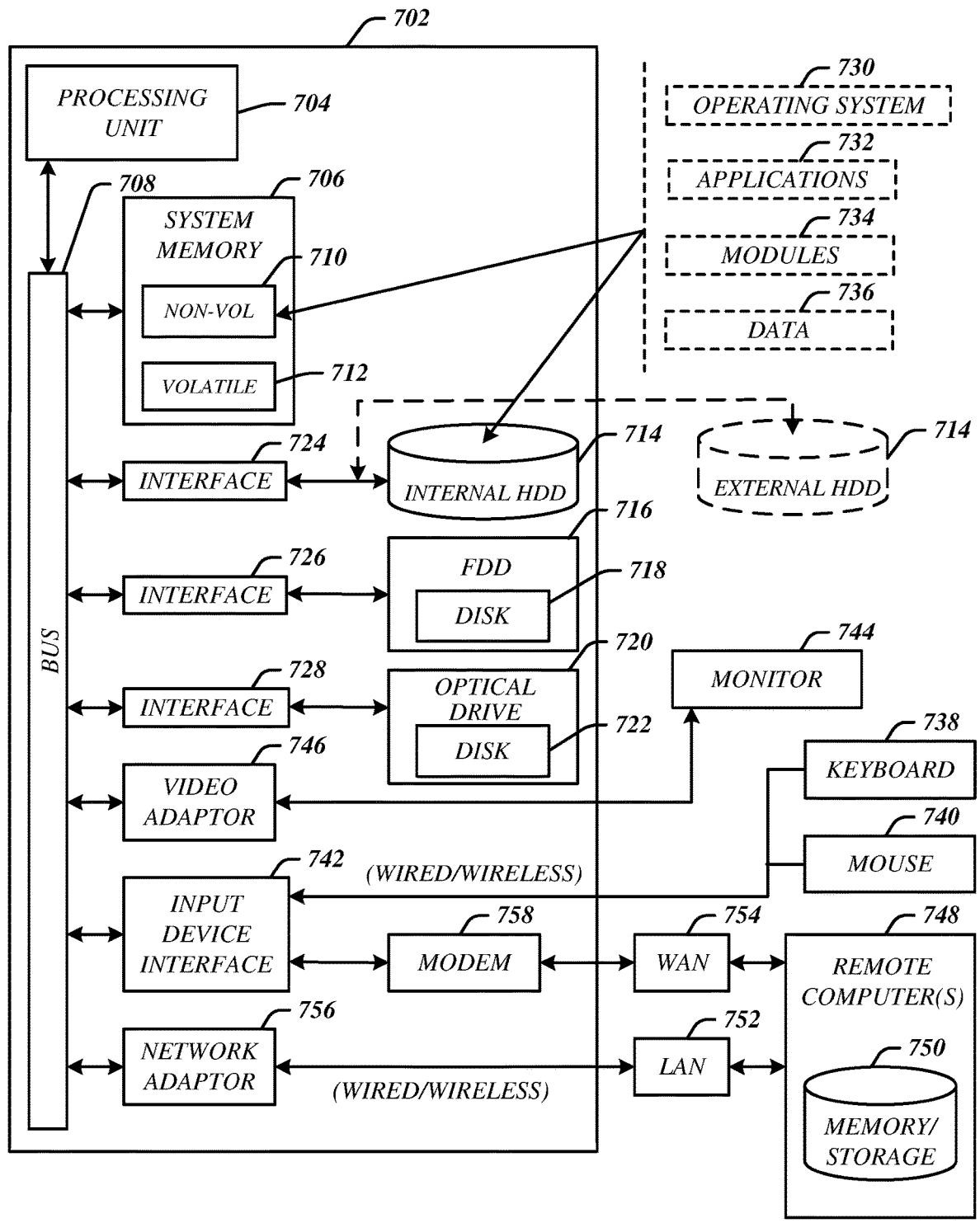
FIG. 7 illustrates an embodiment of a computing architecture.

FIG. 7 illustrates an embodiment of an exemplary computing architecture 700 suitable for implementing various embodiments as previously described. In one embodiment, the computing architecture 700 may comprise or be implemented as part of an electronic device. Examples of an electronic device may include those described with reference to FIG. 8, among others. The embodiments are not limited in this context.

As used in this application, the terms "system" and "component" are intended to refer to a computer-related entity, either hardware, a combination of hardware and software, software, or software in execution, examples of which are provided by the exemplary computing architecture 700. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 700 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 700.

As shown in FIG. 7, the computing architecture 700 comprises a processing unit 704, a system memory 706 and a system bus 708. The processing unit 704 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Itanium®, Pentium®, Xeon®, and XScale® processors; and similar processors. Dual microprocessors, multi-core processors, and other multiprocessor architectures may also be employed as the processing unit 704.

The system bus 708 provides an interface for system components including, but not limited to, the system memory 706 to the processing unit 704. The system bus 708 can be any of several types of bus structure that may further interconnect to a memory bus (with or without a memory controller), a peripheral bus, and a local bus using any of a variety of commercially available bus architectures. Interface adapters may connect to the system bus 708 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 700 may comprise or implement various articles of manufacture. An article of manufacture may comprise a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 706 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 7, the system memory 706 can include non-volatile memory 710 and/or volatile memory 712. A basic input/output system (BIOS) can be stored in the non-volatile memory 710.

The computer 702 may include various types of computer-readable storage media in the form of one or more lower speed memory units, including an internal (or external) hard disk drive (HDD) 714, a magnetic floppy disk drive (FDD) 716 to read from or write to a removable magnetic disk 718, and an optical disk drive 720 to read from or write to a removable optical disk 722 (e.g., a CD-ROM or DVD). The HDD 714, FDD 716 and optical disk drive 720 can be connected to the system bus 708 by a HDD interface 724, an FDD interface 726 and an optical drive interface 728, respectively. The HDD interface 724 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 710, 712, including an operating system 730, one or more application programs 732, other program modules 734, and program data 736. In one embodiment, the one or more application programs 732, other program modules 734, and program data 736 can include, for example, the various applications and/or components of the system 100.

A user can enter commands and information into the computer 702 through one or more wire/wireless input devices, for example, a keyboard 738 and a pointing device, such as a mouse 740. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 704 through an input device interface 742 that is coupled to the system bus 708, but can be connected by other interfaces such as a parallel port, IEEE 1394 serial port, a game port, a USB port, an IR interface, and so forth.

A monitor 744 or other type of display device is also connected to the system bus 708 via an interface, such as a video adaptor 746. The monitor 744 may be internal or external to the computer 702. In addition to the monitor 744, a computer typically includes other peripheral output devices, such as speakers, printers, and so forth.

The computer 702 may operate in a networked environment using logical connections via wire and/or wireless communications to one or more remote computers, such as a remote computer 748. The remote computer 748 can be a workstation, a server computer, a router, a personal computer, portable computer, microprocessor-based entertainment appliance, a peer device or other common network node, and typically includes many or all of the elements described relative to the computer 702, although, for purposes of brevity, only a memory/storage device 750 is illustrated. The logical connections depicted include wire/wireless connectivity to a local area network (LAN) 752 and/or larger networks, for example, a wide area network (WAN) 754. Such LAN and WAN networking environments are commonplace in offices and companies and facilitate enterprise-wide computer networks, such as intranets, all of which may connect to a global communications network, for example, the Internet.

When used in a LAN networking environment, the computer 702 is connected to the LAN 752 through a wire and/or wireless communication network interface or adaptor 756.

The adaptor 756 can facilitate wire and/or wireless communications to the LAN 752, which may also include a wireless access point disposed thereon for communicating with the wireless functionality of the adaptor 756.

When used in a WAN networking environment, the computer 702 can include a modem 758, or is connected to a communications server on the WAN 754, or has other means for establishing communications over the WAN 754, such as by way of the Internet. The modem 758, which can be internal or external and a wire and/or wireless device, connects to the system bus 708 via the input device interface 742. In a networked environment, program modules depicted relative to the computer 702, or portions thereof, can be stored in the remote memory/storage device 750. It will be appreciated that the network connections shown are exemplary and other means of establishing a communications link between the computers can be used.

The computer 702 is operable to communicate with wire and wireless devices or entities using the IEEE 802 family of standards, such as wireless devices operatively disposed in wireless communication (e.g., IEEE 802.11 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

Figure 8:
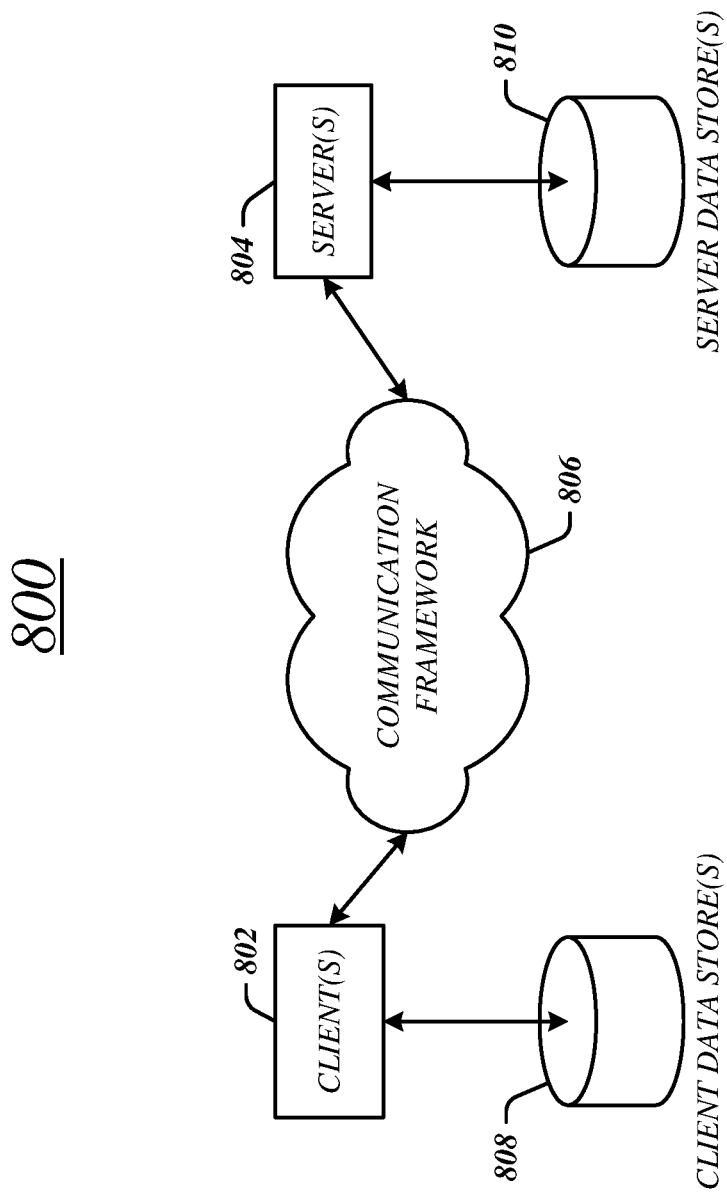
FIG. 8 illustrates an embodiment of a communications architecture.

FIG. 8 illustrates a block diagram of an exemplary communications architecture 800 suitable for implementing various embodiments as previously described. The communications architecture 800 includes various common communications elements, such as a transmitter, receiver, transceiver, radio, network interface, baseband processor, antenna, amplifiers, filters, power supplies, and so forth. The embodiments, however, are not limited to implementation by the communications architecture 800.

As shown in FIG. 8, the communications architecture 800 comprises includes one or more clients 802 and servers 804. The clients 802 may implement the client device 910. The servers 804 may implement the server device 950. The clients 802 and the servers 804 are operatively connected to one or more respective client data stores 808 and server data stores 810 that can be employed to store information local to the respective clients 802 and servers 804, such as cookies and/or associated contextual information.

The clients 802 and the servers 804 may communicate information between each other using a communication framework 806. The communications framework 806 may implement any well-known communications techniques and protocols. The communications framework 806 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communications framework 806 may implement various network interfaces arranged to accept, communicate, and connect to a communications network. A network interface may be regarded as a specialized form of an input output interface. Network interfaces may employ connection protocols including without limitation direct connect, Ethernet (e.g., thick, thin, twisted pair 10/100/1000 Base T, and the like), token ring, wireless network interfaces, cellular network interfaces, IEEE 802.11a-x network interfaces, IEEE 802.16 network interfaces, IEEE 802.20 network interfaces, and the like. Further, multiple network interfaces may be used to engage with various communications network types. For example, multiple network interfaces may be employed to allow for communication over broadcast, multicast, and unicast networks. Should processing requirements dictate a greater amount speed and capacity, distributed network controller architectures may similarly be employed to pool, load balance, and otherwise increase the communicative bandwidth required by clients 802 and the servers 804. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

The invention claimed is:

1. A device, comprising:
a processing circuit;
a computer memory storing information from a number of computer applications executed by the processing circuit; and
logic stored in the computer memory and executed on the processing circuit, wherein the logic is operative to cause the processing circuit to:
interpret raw data from the number of computer applications using a natural language processing mechanism or text summarization techniques;
obtain user activity data and user availability data from the interpreted raw data;
store the user activity data and the user availability data in the computer memory as database information;
access, from the computer memory, the database information including records corresponding to user activity data, user availability data, and events of interest in a geographic area, wherein the database information is provided by the number of applications;
process the database information comprising the records corresponding to the events in the geographic area;
train a machine learning model having features based in part on user preference data in the records in the database information, the user preference data being based on user availability data and user activity data associated with various applications, the user activity data comprising historical events engaged in by a device user, each of the historic events comprising a historical activity attribute and a historical time attribute, the records comprising time attributes and activity attributes for events, and the features comprising a feature value for the user availability data and the user activity data from the user preference data and a likelihood that a user will engage in an event with a time attribute corresponding to at least one of the historical time attributes of the historical events;
apply the trained machine learning model to the accessed database information related to the user activity data, the user availability data and the events of interest in the geographic area;
identify records having events of interest, the records based on receipt of communications comprising information about future activities, based upon values provided by the trained machine learning model by selecting the events of interest that include time attributes that are at future times, each of the events of interest comprising attributes that map to a value exceeding a threshold value and to corresponding attributes of at least a portion of the user preference data, wherein the identifying further includes selecting the attributes that map to the value exceeding the threshold value correspond to a likelihood determined by the machine learning model that the device user will engage in the event of interest, and the likelihood related to the selected events of interest is based on determining at least one time attribute and at least one activity attribute of the selected events of interest exceeding the threshold value, and both of:
the event of interest having an activity attribute similar to a historical activity attribute of at least one of the historical events engaged in by the device user, the at least one of the historical events having a historical time attribute corresponding with the time attribute of the event of interest; and
the event of interest having a time attribute similar to a historical time attribute of at least one of the historical events engaged in by the device user, the at least one of the historical events having a historical activity attribute corresponding with the activity attribute of the event of interest;
generate recommendation data for one or more events of interest in the geographic area in the identified records, generation of recommendation data for at least one of the one or more events of interest to cause the processing circuit to:
store a contact in a contacts portion for an event leader; and
instruct a communication application to generate a communication directed towards the event leader;
display, on a display device of the device, the recommendation data and a selectable option for each event of the one or more events; and
store one or more entries in a calendar application executed by the processing circuit based upon one or more user selections of one or more selectable options on the displayed recommendation data.

2. The device of claim 1, comprising logic operative to cause the processing circuit to compare the identified records with the user availability data to determine whether there is an open time slot in the calendar application or a closed time slot in the calendar application for an event of the one or more events.

3. The device of claim 1 comprising logic operative to cause the processing circuit to use the machine learning model to determine a likelihood that an event is an event of record and determine that an event is an event of interest based upon the likelihood.

4. The device of claim 1 comprising logic operative to cause the processing circuit to update the machine learning model in response to the one or more user selections.

5. The device of claim 1 comprising logic operative to cause the processing circuit to group into clusters of historical events of the user activity data.

6. The device of claim 1 comprising logic operative to identify records having events of interest by comparing clusters of the user availability data with a date attribute, a time attribute, or both the date attribute and the time attribute.

7. The device of claim 1 comprising logic operative to identify records having events of interest based upon a comparison between attribute data within a record and clusters of the user activity data being stored in the various applications.

8. A computer-implemented method executed on a processing circuit in a mobile device, comprising: a number of computer applications using a natural language processing mechanism or text summarization techniques;
obtaining user activity data and user availability data from the interpreted raw data;
storing the user activity data and the user availability data in a memory of the mobile device as database information;
accessing, from a computer memory, database information including records corresponding to events in a geographic area, a mobile device user's activity data and the mobile device user's availability, wherein the database information is provided by the number of applications;

processing the database information comprising records corresponding to the events in the geographic area;

training a machine learning model having features based in part on user preference data that correspond to clusters of historical events associated with the mobile device wherein each cluster corresponds to at least one attribute as defined in the records, the at least one attribute including a historical time attribute and a historical activity attribute, and the features including a feature value for the user availability data and the user activity data from the user preference data and a probability that a user will engage in an event with a time attribute corresponding to the historical time attribute;

apply the trained machine learning model to the accessed database information related to the mobile device user's activity data, the device user's availability data and the events in the geographic area;

identifying records having events of interest of which each event of interest has a likelihood that exceeds a threshold value, the records based on receipt of communications comprising information about future activities, based upon the applying of the machine learning model by selecting the events of interest that include time attributes that are at future times, attributes that map to corresponding attributes of at least a portion of the user preference data, wherein the identifying further includes selecting at least one time attribute and at least one activity attribute of the attributes of the events of interest in the geographic area that map to a value exceeding the threshold value and that correspond to a likelihood determined by the machine learning model that the user will engage in at least one event of interest in the geographic area, wherein the likelihood is further based on both of:

the event of interest having an activity attribute similar to a historical activity attribute of at least one of the clusters of historical events engaged in by the user, the at least one of the clusters of historical events having a historical time attribute corresponding with the time attribute of the event of interest; and the event of interest having a time attribute similar to a historical time attribute of at least one of the clusters of historical events engaged in by the user, the at least one of the clusters of historical events having a historical activity attribute corresponding with the activity attribute of the event of interest;

generating recommendation data for an event in the identified records if there is an open time slot in a calendar application for that event, generation of recommendation data for at least one of the one or more events of interest comprising:

storing a contact in a contacts portion for an event leader; and instructing a communication application to generate a communication directed towards the event leader;

displaying, on a display device, the recommendation data and a selectable option for the event in the recommendation data; and storing an entry in the calendar application in response to a user selection of the selectable option for the event in the displayed recommendation data.

9. The method of claim 8 further comprising updating the machine learning model in response to the user selection.

10. The method of claim 8 further comprising comparing the identified records with user availability data to determine whether there is an open time slot in the calendar application or a closed time slot in the calendar application for an event of the one or more events.

11. The method of claim 8 further comprising mapping portions of an event description to attributes corresponding to user availability data or user activity data.

12. The method of claim 8 further comprising comparing the clusters of the historical events with at least one of a date attribute, a time attribute, a location attribute, an activity attribute, or an activity type attribute.

13. The method of claim 8 further comprising determining that an event is an event of interest based upon a likelihood provided by a cluster corresponding to the at least one of a date attribute, a time attribute, a location attribute, an activity attribute, or an activity type attribute.

14. At least one computer-readable storage medium comprising instructions that, when executed by a processing circuit, cause a system to:

analyze textual information provided by an application of a number of applications;

generate a vector of attributes including an activity attribute;

store user activity data and user availability data in a computer memory as database information;

access, from the computer memory, the database information including records corresponding to user activity data, user availability data, and events of interest in a geographic area, wherein the information is provided by the number of applications;

process database information comprising records corresponding to events in a geographic area;

train a machine learning model having features based in part on user preference data that comprises clusters of attribute data for historical events engaged in by a user, the user preference data being based on user availability data and user activity data associated with various applications, each cluster of the attribute data for historical events comprising a historical time attribute and a historical activity time attribute, and the features including a feature value for the user availability data and the user activity data from the user preference data and a likelihood that the user will engage in an event having a time attribute corresponding to the historical time attribute;

identify a record having an event of interest, the record based on receipt of communications comprising information about future activities, based upon a likelihood associated with attribute data of the record, the event of interest comprising a time attribute that is at a future time, the likelihood being provided by the machine learning model, the likelihood based on both of:

the event of interest having an activity attribute similar to the historical activity attribute of a cluster of the clusters of attribute data, the cluster of the clusters of attribute data having a historical time attribute corresponding with the time attribute of the event of interest; and the event of interest having a time attribute similar to the historical time attribute of a historical event of the cluster of the clusters of attribute data, the cluster of the clusters of attribute data having a historical activity attribute corresponding with the activity attribute of the event of interest, wherein the identifying includes using the machine learning model to determine the likelihood associated with attribute data of the record based upon a cluster corresponding to attribute data of the event of interest;

compare the identified record with the user availability data to determine whether there is an open time slot in a calendar application or a closed time slot in the calendar application for the event in the identified record;

generate recommendation data for the event of interest based on a result of the comparison, generation of recommendation data for at least one of the one or more events of interest to cause the processing circuit to:

store a contact in a contacts portion for an event leader; and instruct a communication application to generate a communication directed towards the event leader;

display, on a display device, the recommendation data and a selectable option for the event of interest; and store one or more entries in the calendar application in response to a user selection of the selectable option on the displayed recommendation data.

15. The computer-readable storage medium of claim 14, comprising instructions that when executed cause the system to:

group into clusters of historical events of the user activity data.

16. The device of claim 1, wherein the logic is further operative to cause the processing circuit to:

analyzing textual information provided by an application of the number of applications; and generating a vector of attributes including an activity attribute.

17. The computer-readable storage medium of claim 14, comprising instructions that when executed cause the system to:

analyze textual information provided by an application of the number of applications; and generate a vector of attributes including an activity attribute.

* * * * *